US009776037B2

(12) United States Patent
Tong

(10) Patent No.: US 9,776,037 B2
(45) Date of Patent: Oct. 3, 2017

(54) EXERCISE APPARATUS USING A SINGLE ELASTIC MEMBER TO GENERATE RESISTANCE FORCE AGAINST COMPRESSION AND EXTENSION OF THE APPARATUS

(71) Applicant: Kun Yuan Tong, Suwanee, GA (US)

(72) Inventor: Kun Yuan Tong, Suwanee, GA (US)

(73) Assignee: Kun Yuan Tong, Suwanee, GA (US)

( * ) Notice: Subject to any disclaimer, the term of this patent is extended or adjusted under 35 U.S.C. 154(b) by 0 days.

(21) Appl. No.: 15/375,404

(22) Filed: Dec. 12, 2016

(65) Prior Publication Data

US 2017/0087399 A1 Mar. 30, 2017

Related U.S. Application Data

(63) Continuation-in-part of application No. 14/120,785, filed on Jun. 27, 2014, now Pat. No. 9,555,279.

(51) Int. Cl.
| | |
|---|---|
| *A63B 21/05* | (2006.01) |
| *A63B 21/00* | (2006.01) |
| *A63B 21/012* | (2006.01) |
| *A63B 21/04* | (2006.01) |
| *A63B 21/055* | (2006.01) |
| *A63B 23/12* | (2006.01) |
| *F16B 7/10* | (2006.01) |
| *A63B 23/035* | (2006.01) |

(52) U.S. Cl.
CPC ........ *A63B 21/4035* (2015.10); *A63B 21/012* (2013.01); *A63B 21/0407* (2013.01); *A63B 21/0552* (2013.01); *A63B 23/03508* (2013.01); *A63B 23/1245* (2013.01); *F16B 7/10* (2013.01); *A63B 21/00061* (2013.01); *A63B 23/03533* (2013.01); *A63B 2225/09* (2013.01)

(58) Field of Classification Search
CPC ..... A63B 21/05; A63B 21/045; A63B 21/055; A63B 21/0552
See application file for complete search history.

(56) References Cited

U.S. PATENT DOCUMENTS 4,290,600 A * 9/1981 Kolbel ................... A63B 21/05
482/126

* cited by examiner

*Primary Examiner* — Loan H Thanh
*Assistant Examiner* — Rae Fischer
(74) *Attorney, Agent, or Firm* — Guosheng Wang; United States Research and Patent Firm

(57) ABSTRACT

The present invention provides exercise apparatus comprising a first handle, an elongated connector, an extension director, a second handle, a rod, and an elongated elastic member having a first end and a second end. The extension director is configured to direct the first end of the elongated elastic member to move to a first direction when the elastic member is stretched by pushing the first handle and the second handle closer to each other, and to a second direction when the elastic member is stretched by pulling the first handle and the second handle away from each other.

6 Claims, 3 Drawing Sheets

EXERCISE APPARATUS USING A SINGLE ELASTIC MEMBER TO GENERATE RESISTANCE FORCE AGAINST COMPRESSION AND EXTENSION OF THE APPARATUS

CROSS-REFERENCE TO RELATED U.S. APPLICATIONS

This application is a Continuation-in-Part of, and claims the benefit of, U.S. application Ser. No. 14/120,785 entitled "Adjustable Resistance Exercise Apparatus" filed on Jun. 27, 2014, the entire disclosure of which is hereby incorporated by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to an exercise apparatus. More particularly, the invention is related to a design of an exercise apparatus that uses a single elastic member to generate resistance force against the compression and extension/expansion of the exercise apparatus. Although the invention will be illustrated, explained and exemplified by an apparatus used for everyday workout and entertainment, it should be appreciated that the present invention can also be applied to other fields, for example, physical therapy, specifically by convalescents of muscular injuries, including cardiac rehab patients to allow slow rebuilding of strength; and the like.

BACKGROUND OF THE INVENTION

Exercise can improve a person's motor skills, fitness, muscle and bone strength, and joint function. Exercise has several effects upon muscles, connective tissue, bone, and the nerves that stimulate the muscles. One of the effects is muscle hypertrophy, which is used in bodybuilding. Many forms of exercise equipment have been designed for this purpose. For example, known exercise apparatuses employ weights to be lifted through a range of motion for exercising specific muscles of the body. Other known apparatuses utilize friction mechanisms to generate a resistance proportion to relative movement of certain components of the exercising device.

Resistive elastic members have gained increased popularity due to their ability to provide substantially consistent tension throughout the desired range of motion and generate an increased use of stabilizer muscles to oppose the substantially consistent tension. Therefore, many exercise apparatuses use springs, rubber bands, plates, and surgical tubing or bungee cables to produce elastic resistance to movement in a particular direction. On the other hand, portable exercise devices have been a popular alternative to health club memberships for many fitness-minded people. The convenience of having an exercise machine at home allows people to fit exercise into their schedules easily because they are not limited by health club schedules or inclement weather conditions.

However, known portable exercise apparatus provides only compression or extension force. For example, an elastic band on exercise apparatus normally provides only pulling or extension force to strengthen extensor group of muscles, such as deltoid muscle, triceps and subscapular muscle. Therefore, there exists a need to design a portable exercise apparatuses that produces elastic resistance to movements in more than one particular direction.

Advantageously, the present invention provides an exercise apparatus that uses a single elastic member to generate resistance force against both the compression and the extension/expansion of the exercise apparatus. In a preferred embodiment, the present designed exercise apparatus can provide the compression and extension force by the same elastic band.

SUMMARY OF THE INVENTION

One aspect of the present invention provides an exercise apparatus comprising a first handle, an elongated connector, an extension director, a second handle, a rod, and an elongated elastic member having a first end and a second end. The elongated connector is connectable to the first handle at one end of the elongated connector, and is connectable to the extension director at another end of the elongated connector. One end of the rod is connectable to the second handle, and another end of the rod is connectable to the first end of the elongated elastic member. The second end of the elongated elastic member is connectable to the first handle. The extension director is configured to direct the first end of the elongated elastic member to move to a first direction when the elastic member is stretched by pushing the first handle and the second handle closer to each other, and to a second direction when the elastic member is stretched by pulling the first handle and the second handle away from each other.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form in order to avoid unnecessarily obscuring the present invention. Other parts may be omitted or merely suggested.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

Figure 1:
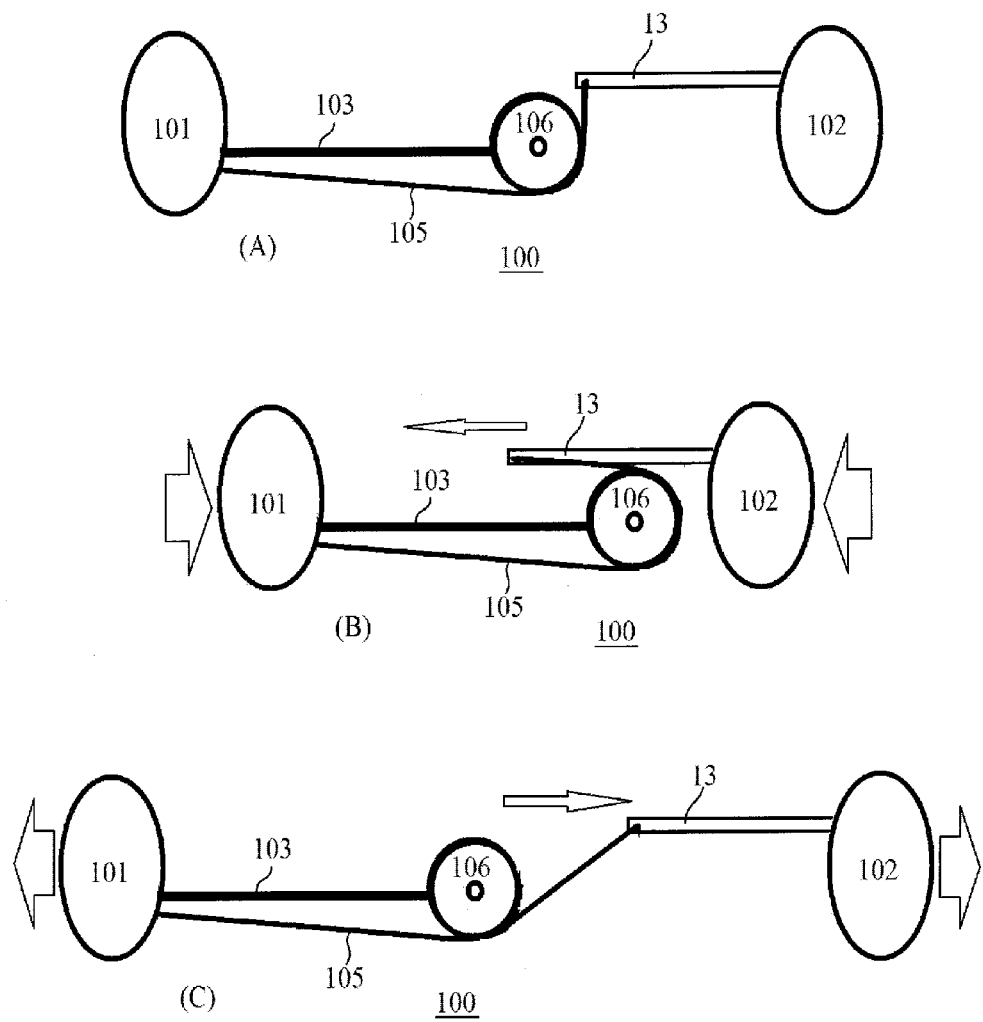
FIG. 1 schematically shows a basic configuration of an exercise apparatus in accordance with an exemplary embodiment of the present invention.

Referring to Panel A in FIG. 1, an exercise apparatus 100 comprises a first handle 101, a second handle 102, an elongated connector 103, a rod 13, an extension director 106, and an elongated elastic member 105 having a first end and a second end. Elongated connector 103 is connectable to the first handle 101 at one end of the elongated connector, and is connectable to (or permanently connected to) the extension director 106 at another end of the elongated connector 103. One end of the rod 13 is connectable to the second handle 102, and another end of the rod 13 is connectable to the first end of the elongated elastic member 105. The second end of the elongated elastic member 105 is connectable to the first handle 101.

Referring to Panel B in FIG. 1, extension director 106 may be configured to direct the first end of the elongated elastic member 105 to move to a first direction (e.g. the left direction represented by the arrow), when the elastic member 105 is stretched by pushing the first handle 101 and the second handle 102 closer to each other.

Referring to Panel C in FIG. 1, extension director 106 may be configured to direct the first end of the elongated elastic member 105 to move to a second direction (e.g. the right direction represented by the arrow), when the elastic member 105 is stretched by pulling the first handle 101 and the second handle 102 away from each other. Comparing Panel B with Panel C, the first direction is opposite to the second direction.

Figure 2:
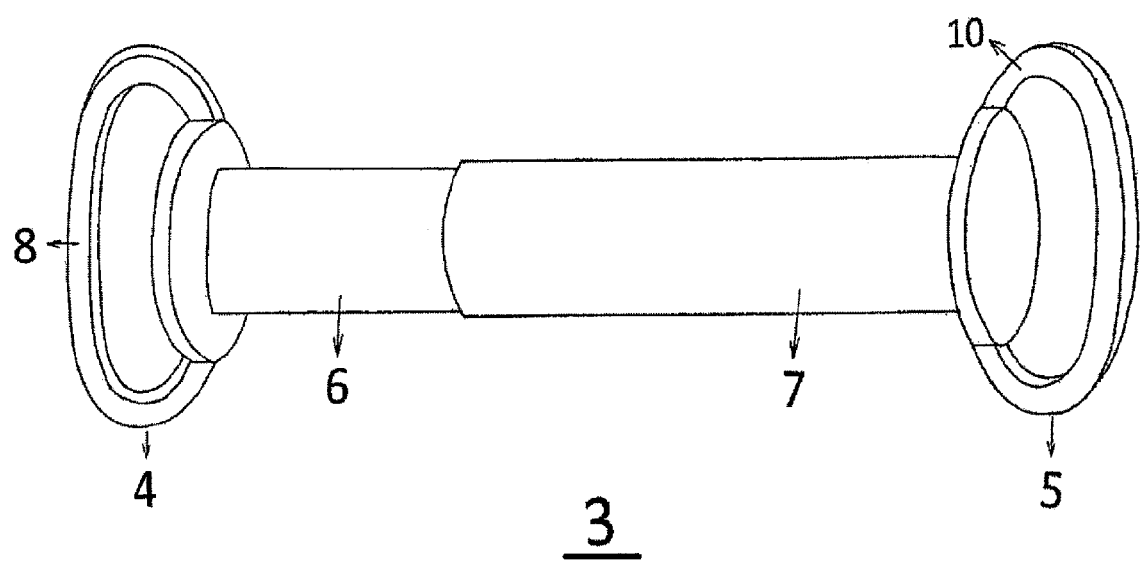
FIG. 2 illustrates the external appearance of an exercise apparatus in accordance with an exemplary embodiment of the present invention.
Figure 3:
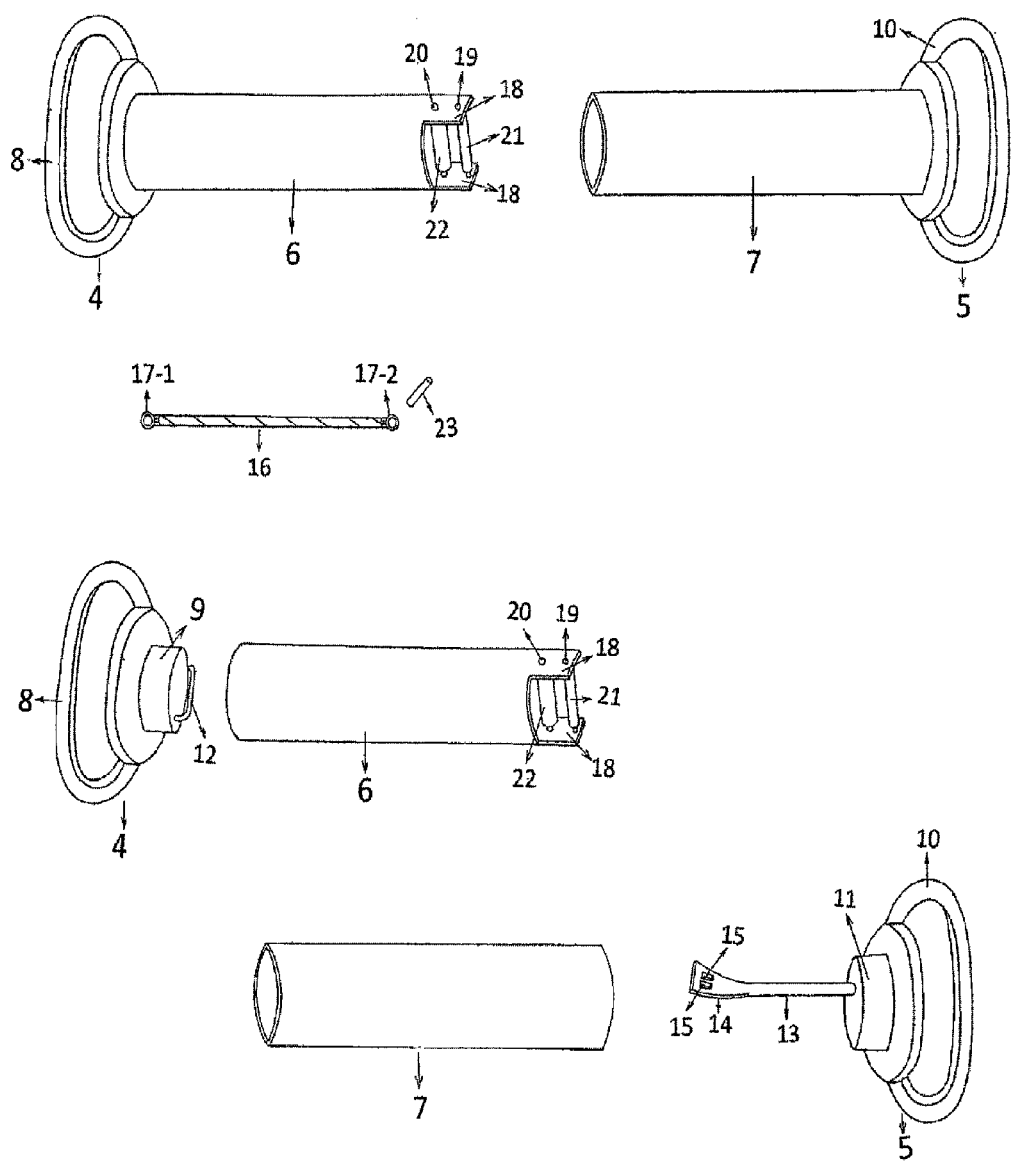
FIG. 3 demonstrates the internal structure of an exercise apparatus in accordance with an exemplary embodiment of the present invention.

The exercise apparatus 3 as shown in FIGS. 2 and 3 is an exemplary embodiment of the exercise apparatus 100 as shown in FIG. 1. Referring to FIGS. 2 and 3, an inner telescoping tube 6 is a specific example of elongated connector 103 in FIG. 1. Outer telescoping tube 7 is an additional part that works with inner telescoping tube 6. Outer telescoping tube 7 is typically a little larger than inner telescoping tube in diameter. An example of first handle 101 includes those parts as represented by reference numbers 4, 8, 9 and 12 in FIGS. 2 and 3. An example of second handle 102 includes those parts as represented by reference numbers 5, 10 and 11 in FIGS. 2 and 3. An example of rod 13 may include those parts as represented by reference numbers 14 and 15 in FIGS. 2 and 3. An example of extension director 106 includes those parts as represented by reference numbers 18, 19, 20, 21 and 22 in FIG. 3. An example of elongated elastic member 105 includes those parts as represented by reference numbers 16, 17-1 and 17-2 in FIGS. 2 and 3. An additional component, pin 23, is used to removably connect rod 13 and elongated elastic member 105.

When inner telescoping tube 6 is used as elongated connector 103, at least a portion of the elongated elastic member 105 is housed inside the tube 6. Outer telescoping tube 7 can telescope and slide on the inner telescoping tube 6. Outer telescoping tube 7 is configured to be connectable to the second handle 102, and to house the rod 13, the extension director 106, and at least a portion of the elongated elastic member 105. In an embodiment, the entire elongated elastic member 105 is housed inside the outer telescoping tube 7 and the inner telescoping tube 6.

In an embodiment, extension director 106 comprises two prongs 18 extended out from inner telescoping tube 6, two bolts 19 and 20 installed on the prongs 18, and two circular rollers 21 and 22 enclosing said two bolts 19 and 20.

In an embodiment, outer telescoping tube 7 is of the same length as that of inner telescoping tube 6, and two tubes overlap each other about half of that length.

In an exemplary embodiment, elongated elastic member 105 maybe an elastic band 16 installed with two ring 17-1 and 17-2 on its two ends, for removably connecting to the rod 13 and the first handle 101. The exercise apparatus of the invention may further comprise a pin that can pass through the rings, e.g. ring 17-2.

Referring to FIGS. 2 and 3 for more details, a same elastic member 16 in exercise apparatus 3 can generate a resistance force against both extension and compression of exercise apparatus 3. Thus, the invention provides an exercise apparatus of combined extension and compression by the same elastic band. In various embodiments, elastic member 16 may be a spring or a resistance band that is designed for strength training. A user can push a left handle 4 and a right handle 5 together to compress exercise apparatus 3, or pull them away from each other to extend apparatus 3. Inner telescoping tube 6 and outer telescoping tube 7 are of the same length and overlap each other half way (i.e. overlap half the length). Outer telescoping tube 7 can telescope and slide loosely on inner telescoping tube 6. Inner telescoping tube 6 may have, for example, about one to one and a half inches in diameter, and may be about one and a half to two feet long.

Left handle 4 has a D-shaped handgrip 8, and circular base 9. Circular base 9 can insert snugly and tightly into inner telescoping tube 6. A C-shaped hook 12 is built on the circular base 9 to hook ring 17-1. Right handle 5 has a D-shaped handgrip 10 and a circular base 11. Circular base 11 can insert snugly and tightly into outer telescoping tube 7. Rod 13 is built on circular base 11 about, for example, one half (½) inch from the center of circular base 11. The length of rod 13 may be about half of the length of inner telescoping tube 6. The other end of rod 13 is configured as a flat broad bent end 14, which has about a 30-degree curvature pointing outwardly (i.e. away from the center of the tube 7), and which is about one-inch long. One or more holes 15 such as rectangular holes may be built at the middle part of bent end 14. In an embodiment, two or three rectangular holes 15 are built at the middle part of bent end 14.

In an example, rod 13 has a length about half the length of that of inner telescoping tube 6. Rod 13 is built on handle 102 at one end and has a flat broad bent end 14 at the other end. Flat broad bent end 14 may have a 30-degree curvature, and may have two to three round holes 15 at the middle region thereof.

Referring to FIGS. 2 and 3, elastic member such as an elastic/rubber band 16 may be less than one quarter (¼) inch in diameter and may be shorter (e.g. about one inch shorter) than inner telescoping tube 6. Elastic member such as elastic/rubber band 16 may a variable power and, it may be exchangeable. Ring 17-1 is installed at one end of elastic band 16. Ring 17-2 is installed at the other end of elastic band 16. Ring 17-1 and ring 17-2 may be two identical rings. Elastic band 16 is preferably not longer than inner telescoping tube 6, for example, about half inch shorter than inner telescoping tube 6. Prong 18 is built at one end of inner telescoping tube 6. For example, two identical prongs 18 may be built facing each other at one end of inner telescoping tube 6. Prongs 18 may be built at 3 and 9 o'clock points facing each other and may have installed two bolts 18 and 19 which are about half an inch apart. Prongs 18 may be built at the middle line aligning along the axis of inner telescoping tube 6. For two bolts 18 and 19, one may be smaller, and closer to the end of prong, and another one may be larger, and far away from the end of prong. Two circular rollers 21 and 22 of different size may be used to enclose two bolts 18 and 19, wherein the smaller one encloses the smaller bolt (19 and 21) and the larger one encloses the larger bolt (20 and 22).

Referring now to FIG. 3 for more details, bolt 19 is installed close to the end of prong 18. Bolt 19 may be about ⅛ inch in diameter. Bolt 20 may be installed about half an inch away from bolt 19 toward circular base 9. Bolt 20 can be identical or larger than bolt 19 and they may be about half an inch apart.

Circular roller 21 encircles bolt 19, and another (typically larger) circular roller 22 encircles bolt 20 and may be one quarter inch (¼) in diameter. The space in between roller 21 and roller 22 should be wide enough to allow elastic band 16 to pass through. Since rod 13 is about one half (½) inch eccentric from the center of circular base 11 and circular roller 22 is only about one quarter inch (¼) inch in diameter, rod 13 and elastic band 16 together can move and pass by roller 22. Pin 23 can pass through ring 17-2 to fix it on the bent end 14.

The first step to assemble the components as shown in FIGS. 1 and 2 is to hook ring 17-1 on C-shaped hook 12. The second step is to pass ring 17-2 through inner telescoping tube 6. The third step is to install inner telescoping tube 6 onto circular base 9. The fourth step is to insert inner telescoping tube 6 into outer telescoping tube 7. The fifth step is to pass ring 17-2 through the space between roller 21 and roller 22, and then pass it through rectangular hole 15 of bent end 14 with bent end 14 pointing outwardly away from roller 21. The sixth step is to insert pin 23 through ring 17-2 to fix ring 17-2 on bent end 14. Because elastic band 16 is about one inch shorter than inner telescoping 6, elastic band 16 can now pull the bent end 14 of rod 13 against roller 21 and roller 22 to stabilize rod 13. The seventh step is to insert outer telescoping tube 7 onto circular base 11 of handle 5 to complete the assembly.

An exerciser can uses two hands to grasp handles 4 and 5 and pull them outwardly to stretch elastic band 6 to strengthen extensor muscles. When the exerciser grasps two handles 4 and 5 and squeeze them inwardly together to strengthen compressor muscles. The embodiment utilizes bolts 19 and 20 as a level to produce exercise force, with a single elastic band 16, in both directions of compression and extension to strengthen both compressor muscles and extensor muscles.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. An exercise apparatus comprising:
   a first handle;
   an extension director;
   an elongated connector,
   wherein the elongated connector is an inner telescoping tube and is connected to the first handle at one end of the tube and to the extension director at the other end of the tube;
   a second handle;
   a rod;
   a single rubber band having a first end and a second end; and
   an outer telescoping tube that is configured to slide on the inner telescoping tube,
   wherein the single rubber band is housed inside the inner telescoping tube;
   wherein the outer telescoping tube is connected to the second handle, and is configured to house the rod, the extension director, and at least a portion of the single rubber band,
   wherein one end of the rod is connected to the second handle, and another end of the rod is connected to the first end of the single rubber band;
   wherein the second end of the single rubber band is connected to the first handle;
   wherein the extension director is configured to direct the first end of the single rubber band to move to a first direction and generate a resistance force when the single rubber band is stretched by pushing the first handle and the second handle closer to each other, and to a second direction and generate a resistance force when the single rubber band is stretched by pulling the first handle and the second handle away from each other; and
   wherein the first direction is opposite to the second direction.

2. The exercise apparatus according to claim 1, wherein, the entire single rubber band is housed inside the outer telescoping tube and the inner telescoping tube.

3. The exercise apparatus according to claim 2, wherein the extension director comprises two prongs that are extended out from the inner telescoping tube, two bolts installed on the prongs, and two circular rollers enclosing said two bolts.

4. The exercise apparatus according to claim 3, wherein said outer telescoping tube is of the same length as that of said inner telescoping tube, and they overlap each other.

5. The exercise apparatus according to claim 4, wherein the single rubber band is installed with a ring on each end, for removably connecting to the rod and the first handle.

6. The exercise apparatus according to claim 5, further comprising a pin configured to pass through said ring of the elastic band to removably connect the rod and the single rubber band.

\* \* \* \* \*